United States Patent [19]

Frayer

[11] Patent Number: 5,206,282
[45] Date of Patent: Apr. 27, 1993

[54] MOLDING COMPOSITIONS COMPRISING REINFORCED FILLED WHOLLY AROMATIC POLYESTERS

[75] Inventor: Paul D. Frayer, Martinez, Ga.

[73] Assignee: Amoco Corporation, Chicago, Ill.

[21] Appl. No.: 620,160

[22] Filed: Nov. 12, 1990

Related U.S. Application Data

[63] Continuation of Ser. No. 349,718, May 10, 1989, abandoned, which is a continuation of Ser. No. 28,306, Mar. 20, 1987, abandoned.

[51] Int. Cl.$^5$ .................... C08L 67/03; C08L 67/04
[52] U.S. Cl. .................................. 524/451; 524/423; 524/437; 524/456; 524/539; 524/599; 524/604; 524/605; 525/444; 525/451
[58] Field of Search ............... 524/451, 605, 604, 423, 524/437, 456, 539, 599

[56] References Cited

U.S. PATENT DOCUMENTS

| | | | |
|---|---|---|---|
| 4,124,561 | 11/1978 | Phipps | 524/451 |
| 4,267,289 | 5/1981 | Froix | 525/444 |
| 4,563,508 | 1/1986 | Cottis | 525/444 |
| 4,585,823 | 4/1986 | Saito | 525/456 |
| 4,626,557 | 12/1986 | Duska | 523/100 |

Primary Examiner—Patricia A. Short
Attorney, Agent, or Firm—Matthew R. Hooper; Stephen L. Hensley; Frank J. Sroka

[57] ABSTRACT

This invention provides molding compositions which comprise reinforced filled wholly aromatic polyesters and which can be molded into useful articles having low warpage values and good tensile strengths.

18 Claims, No Drawings

MOLDING COMPOSITIONS COMPRISING REINFORCED FILLED WHOLLY AROMATIC POLYESTERS

This is a continuation of application Ser. No. 07/349,718, filed May 10, 1989, now abandoned which in turn is a continuation of Ser. No. 028,306 filed Mar. 20, 1987, now abandoned.

This invention relates to molding compositions comprising reinforced filled wholly aromatic polyesters. More particularly, this invention relates to molding compositions comprising reinforced filled wholly aromatic polyesters which can be molded into articles having low warpage values and tensile strengths of at least 10,000 pounds per square inch.

Wholly aromatic polyesters are known to be self-reinforcing. Attempts to provide additional reinforcement, such as with glass fibers, have not been successful because the reinforcing component has a tendency to decrease the self-reinforcement of the wholly aromatic polyesters. Additionally, the use of a reinforcing component may not provide compositions which have significantly better properties. In some instances, these properties may be worse than the wholly aromatic polyester without the reinforcing component.

Wholly aromatic polyesters, with or without a reinforcing component, typically have a high level of anisotropy which can lead to warpage and to unacceptable molded articles. A decrease in the warpage values of wholly aromatic polyesters can be attained through the use of fillers. However, the use of fillers can lead to a decrease in the mechanical properties (such as tensile strength) of the molded articles.

These concepts are discussed by H. Voss and K. Friedrich, *Journal of Materials Science*, Volume 26 (1986), pp. 2889-2900 and L. K. English in *Mechanical Engineering*, March 1986, pp. 36-41.

Therefore, a need exists to provide a reinforced filled wholly aromatic polyester which can be molded into useful articles having good mechanical properties (such as tensile strength and impact strength) and low warpage values.

Accordingly, an object of this invention is to provide useful molding compositions which comprise wholly aromatic polyesters.

Another object of this invention is to provide useful molding compositions which comprise reinforced filled wholly aromatic polyesters.

Another object of this invention is to provide such compositions which can be molded into useful articles having good mechanical properties, such as tensile strength and impact strength.

Another object of this invention is to provide such compositions which can be molded into useful articles having low warpage values.

These and other objects, features and advantages of this invention, will become apparent from the following detailed description.

In accordance with the present invention, molding compositions are provided which comprise:

(a) from about 60 to about 80 percent, by volume, of a wholly aromatic polyester component;

(b) from about 10 to about 20 percent, by volume, of a reinforcing component; and (c) from about 10 to about 30 percent, by volume, of a filler component, wherein an article molded from the composition exhibits a low warpage value and a tensile strength of at least 10,000 pounds per square inch and wherein the sum of components (b) and (c) is from about 20 to about 40 percent, by volume.

The tensile strengths recited in this application are determined by the ASTM D-638 method.

The warpage values recited in this application are determined by the following method:

A composition is molded into a connector having dimensions of about 4.65" length, 0.6" width and 0.285" thickness. The connector is placed on a flat surface, and the warpage is observed along the length direction of the connector, with the width direction at right angles to the flat surface. The amount of warpage is measured at the center of the connector by determining the distance (in mils) between the center and the flat surface.

In this method, warpage is measured twice. The first measurement ("as-molded") is taken immediately after the connector is molded. The second measurement is taken after heating the connector in an oven at 500° F. for 10 minutes to simulate soldering conditions.

As used in this application, the term "low warpage" means a value which is less than about 5 mils as-molded (first measurement) and less than about 15 mils after thermal treatment at 500° F. for 10 minutes (second measurement).

The wholly aromatic polyesters useful in this invention have melting temperatures of between about 200° C. and 450° C. and comprise repeating units of one or more of the following formulas:

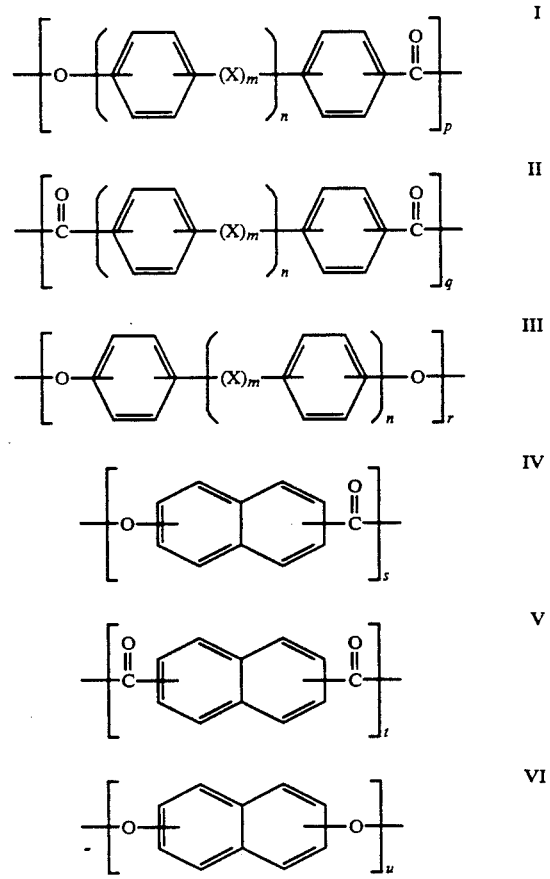

where X is —O—, —S—, —CO—, or —SO2—, and m and n are independently zero or one, and the total of the integers p+q+r+s+t+u is from approximately 3 to about 800.

In the most general combination, all of the units of the above formula can be present in a single polyester. A simple embodiment would be homopolymers of units I or IV.

The preferred locations of the functional groups are in the para (1,4) and meta (1.3) positions. With respect to the naphthalene moiety, the preferred locations of the functional groups are 1,4; 1,5 and 2,6.

The symbols p, q, r, s, t, and u are integers and indicate the number of moieties present in the polyester. The total (p+q+r+s+t+u) can vary from 3 to 800 and, when present, the ratio of q:r, q:u, t:r, t:u, q+t:r, q+t:r+u, and t:r+u, of the moieties can vary about 10:11 to about 11:10, with the most preferably ratio being 10:10.

Exemplary of monomers from which the moieties of formula I may be obtained are: p-hydroxybenzoic acid, phenyl-p-hydroxybenzoate, p-acetoxybenzoic acid and isobutyl-p-acetoxybenzoate. Those monomers from which the moiety of formula II may be obtained include terephthalic acid, isophthalic acid, diphenyl terephthalate, diethyl isophthalate, methylethyl terephthalate and the isobutyl half ester of terephthalic acid. Among the monomers from which the moiety of formula III results are: p,p'-biphenol; p,p'-oxybiphenol; 4'-dihydroxybenzophenone; resorcinol and hydroquinone.

Examples of monomers represented by formula IV are: 4-hydroxy-1-naphthoic acid; 5 acetoxy-1-naphthoic acid; and phenyl 5-hydroxy-1-naphthoate. Monomers representing formula V include: 1, 4-naphthalene dicarboxylic acid; 1, 5-naphthalene dicarboxylic acid and 2, 6-naphthalene dicarboxylic acid. The diphenyl esters or dicarbonyl chlorides of these acids can also be used. Examples of the monomers representative of the formulas VI are 1, 4-dihydroxynaphthalene; 2, 6-diacetoxynaphthalene and 1, 5-dihydroxynaphthalene.

A preferred class of polyesters has recurring units of formulas VII, VIII, and IX:

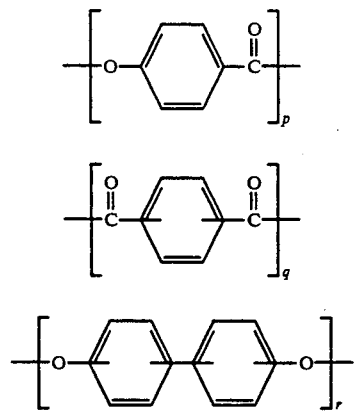

wherein the total of the integers p+q+r is about 3 to 800, the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

The polyesters of this invention comprise the precursor formulas VII, VIII and IX wherein the molar ratios are from 0.01:1:1 to 99:1:1 and preferably from 1:1:1 to 5:1:1.

Methods for the synthesis of these wholly aromatic polyesters are described in Cottis et al. U.S. Pat. Nos. 3,637,595 and 4,563,508 and in Finestone U.S. patent application Ser. No. 06/556,485, filed Nov. 30, 1983.

Examples of reinforcing components useful in this invention are glass fibers, carbon fibers and graphite fibers. A preferred reinforcing component comprises glass fibers.

A useful range of the reinforcing component is from about 10 to 20 percent, by volume, based on the molding composition.

Examples of filler components useful in this invention are talc, aluminum powder, calcium sulfate, wollastonite, inert inorganic pigments, inorganic silicates and carbon black. A preferred filler component comprises talc, calcium sulfate or carbon black.

A useful range of the filler component is from about 10 to 30 percent, by volume, based on the molding composition. A preferred range is from about 10 to 20 percent, by volume.

Within the scope of this invention, the wholly aromatic polyester, reinforcing and filler components may comprise a combination of two or more of these materials.

An important feature of this invention is that the combination of reinforcing and filler components is from about 20 to 40 percent, by volume, based on the molding composition, and preferably from about 27 to 33 percent, by volume. Amounts not within this range generally do not provide an acceptable tensile and impact strengths and low warpage value for the molded articles.

The compositions of this invention can be molded, by conventional techniques, into articles which have good mechanical properties, such as dimensional stability, tensile strength and thermal stability. Example of these articles include connectors for use in the electrical/electronics industry.

With regard to selected electronic applications, electrically conductive filler materials (such as certain aluminum powders and carbon blacks) can be used to great advantage.

The wholly aromatic polyesters useful in the present invention can also be chemically modified by various means such as by inclusion in the polyester of monofunctional reactants such as benzoic acid or a higher functional reactant such as trimesic acid or cyanuric chloride. The benzene rings in these polyesters are preferably unsubstituted but can be substituted with noninterferring substituents, examples of which include halogens (such as chlorine or bromine), lower alkoxy groups (such as methoxy), and lower alkyl groups (such as methyl and ethyl).

The invention is further illustrated by the following examples which are illustrative of certain embodiments designed to teach those of ordinary skill in the art how to practice the invention and to represent the best mode contemplated for carrying out the invention.

The wholly aromatic polyesters are prepared by conventional polycondensation methods and formulated with reinforcing and filler materials into molding compositions shown as Examples 1–7 in the following Table. The resulting compositions are molded into electrical connectors, and the tensile strengths and warpage values are shown in the Table.

| Example | Reinforcing Material | Reinforcing Material Vol. % | Filler Material | Filler Material Vol. % | Polyester Vol. % | Tensile Strength (psi) | As-Molded Warpage Value (mils) | Warpage Value (mils) after 10 min at 500° F. |
| --- | --- | --- | --- | --- | --- | --- | --- | --- |
| 1 | Glass Fibers | 19 | none | none | 81 | 20,000 | 7 | 22 |
| 2 | Glass Fibers | 28.6 | CaSO4 | 6.1 | 65.3 | 14,000 | 3 | 15 |
| 3 | Glass Fibers | 18.8 | talc | 14.7 | 66.5 | 13,990 | 3 | 13 |
| 4 | Glass Fibers | 19.0 | talc | 13.9 | 67.1 | 13,770 | 4 | 12 |
| 5 | Glass Fibers | 12.8 | talc | 19.7 | 67.5 | 13,660 | 2 | 7 |
| 6 | Milled Glass Fibers | 16.5 | CaSO4; Conductive Carbon Black | 14.1; 4.0 | 65.4 | 12,020 | * | * |
| 7 | Glass Fibers | 13.7 | talc; Conductive Carbon Black | 12.7; 3.9 | 69.7 | 12,050 | * | * |

The Table shows that Examples 3, 4 and 5 have acceptable tensile strengths and warpage values.

Examples 1 and 2 have good tensile strengths but do not have acceptable warpage values in both measurements.

Examples 6 and 7 have acceptable tensile strengths, but the warpage values were not measured as with Examples 1–5. These two examples were molded into large frames, and visual observations showed the warpage to be low and, therefore, acceptable.

In Examples 1–7, the wholly aromatic polyester component comprises two wholly aromatic polyesters. The first polyester is made from p-hydroxybenzoic acid; 4,4'-dihydroxybiphenyl; and terephthalic acid in the molar ratio of 2:1:1. The second polyester is made from p-hydroxybenzoic acid; 4,4'-dihydroxybiphenyl; and isophthalic acid in the molar ratio of 3.7:1:1, and is used in an amount of less than 5%, by weight, based on the total molding composition.

EXAMPLE 8

A composition is made from 12.8 volume percent glass fiber, 19.7 volume percent talc and 67.5 volume percent of a wholly aromatic polyester component comprising two wholly aromatic polyesters. The first polyester is made from p-hydroxybenzoic acid; 4,4'-dihydroxybiphenyl and terephthalic acid in the molar ratios of 2:1:1, respectively, and the second polyester is made from p-hydroxybenzoic acid; 4,4'-dihydroxybiphenyl, terephthalic acid and isophthalic acid in the molar ratios of 3:1:0.75:0.25, respectively. The second polyester is used in an amount equal to 10.0 percent by weight based on the total molding composition. Molded parts from this composition demonstrated excellent impact strength and low warpage.

The foregoing description relates to certain embodiments of the present invention, and modifications or alterations may be made without departing from the spirit and scope of the invention as set forth in the claims.

I claim:

1. A molding composition having a tensile strength of at least 10,000 pounds per square inch, an as molded warpage value of less than about 5 mils, and a warpage value, after thermal treatment at 500° F. for 10 minutes, of less than about 15 mils, said molding composition comprising;
    (a) from about 60 to about 80 percent, by volume, of a wholly aromatic oxybenzoyl polyester component;
    (b) from about 10 to about 20 percent, by volume, of a glass fiber component; and
    (c) from about 10 to about 30 percent, by volume, of a filler component,
wherein an article molded from the composition exhibits a tensile strength of at least 10,000 pounds per square inch and wherein the sum of components (b) and (c) is from about 20 to about 40 percent, by volume.

2. A molding composition as defined by claim 1 wherein the wholly aromatic polyester component comprises repeating units of one or more of the following formulas:

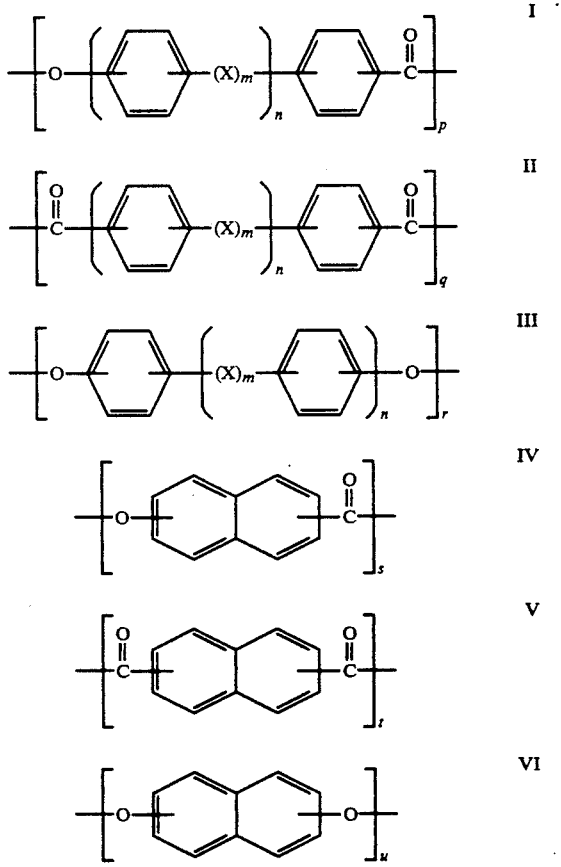

where X is —O—, —S—, —CO—, or —SO2; and m and n are independently zero or one, and the total of the integers p+q+r+s+t+u is from approximately 3 to about 800.

3. A molding composition as defined by claim 2 wherein each of the ratios q:r, q:u, t:r, t:u, q+t:r, q+t:r+u, and t:r+u, of the moieties present, is about 10:11 to about 11:10.

4. A molding composition as defined by claim 3 wherein each of the ratios is about 10:10.

5. A molding composition as defined by claim 2 wherein n is zero.

6. A molding composition as defined by claim 1 wherein the wholly aromatic polyester component comprises repeating units of one or more of the following formulas:

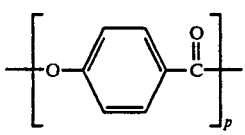

VII

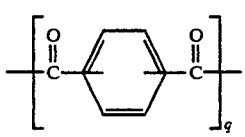

VIII

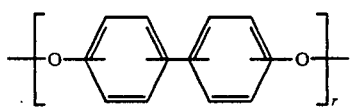

IX wherein the total of the integers p+q+r is about 3 to 800, the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

7. A molding composition as defined by claim 6 wherein the wholly aromatic polyester component comprises repeating units of formulas VII, VIII and IX, wherein the molar ratios are from 0.01:1:1 to 99:1:1, respectively.

8. A molding composition as defined by claim 6 wherein the wholly aromatic polyester component comprises repeating units of formulas VII, VIII and IX, wherein the molar ratios are from 1:1:1 to 5:1:1, respectively.

9. A molding composition as defined by claim 6 wherein the wholly aromatic polyester component comprises repeating units of formulas VII, VIII and IX, wherein the molar ratios are 2:1:1 respectively.

10. A molding composition as defined by claim 1 wherein the filler component is talc.

11. A molding composition as defined by claim 10 wherein the sum of components (b) and (c) is from about 27 to about 33 percent, by volume.

12. A molding composition as defined by claim 6 wherein component (b) comprises talc and the sum of components (b) and (c) is from about 27 to about 33 percent, by volume.

13. A molding composition as defined by claim 1 wherein wholly aromatic polyester component comprises a combination of two wholly aromatic polyesters.

14. A molding composition as defined by claim 13 wherein the wholly aromatic polyesters are made from (a) p-hydroxybenzoic acid; 4,4'-dihydroxybiphenyl; and terephthalic acid in the molar ratio of 2:1:1 and (b) p-hydroxybenzoic acid; 4,4'-dihydroxybiphenyl; and isophthalic acid in the molar ratio of 3.7:1:1.

15. A molding composition as defined by claim 14 wherein the polyester made from isophthalic acid is present in an amount up to about 7 percent, by weight, based on the total molding composition.

16. A molding composition as defined by claim 13 wherein the wholly aromatic polyesters are made from (a) p-hydroxybenzoic acid; 4,4'-dihydroxybiphenyl; and terephthalic acid in the molar ratio of 2:1:1 and (b) p-hydroxybenzoic acid; 4,4'-dihydroxybiphenyl; terephthalic acid; and isophthalic acid in the molar ratio of 3:1:0.75:0.25.

17. A molding composition as defined by claim 16 wherein the polyester made from both terephthalic and isophthalic acids is present in an amount up to about 15 percent, by weight, based on the total molding composition.

18. A molded electrical connector having a tensile strength of at least 10,000 pounds per square inch, an as molded warpage value of less than about 5 mils, and a warpage value, after thermal treatment at 500° F. for 10 minutes, of less than about 15 mils; said connector being obtained from a molding composition comprising;
(a) from about 60 to about 80 percent, by volume, of a wholly aromatic oxybenzoyl polyester component;
(b) from about 10 to about 20 percent, by volume, of a glass fiber component; and
(c) from about 10 to about 30 percent, by volume, of a filler component,
wherein the sum of components (b) and (c) is from about 20 to about 40 percent, by volume.

* * * * *